United States Patent
McConnell Smith et al.

(10) Patent No.: US 9,253,939 B2
(45) Date of Patent: Feb. 9, 2016

(54) METHOD OF COATING SEED

(71) Applicant: Dow AgroSciences LLC, Indianapolis, IN (US)

(72) Inventors: Heather McConnell Smith, Pontiac, IL (US); Scott M. Fleming, Merill, MI (US); Alan Howard Paulsen, Midland, MI (US)

(73) Assignee: Agrigenetics, Inc., Indianapolis, IN (US)

(*) Notice: Subject to any disclaimer, the term of this patent is extended or adjusted under 35 U.S.C. 154(b) by 143 days.

(21) Appl. No.: 13/834,139

(22) Filed: Mar. 15, 2013

(65) Prior Publication Data
US 2014/0173979 A1   Jun. 26, 2014

Related U.S. Application Data

(60) Provisional application No. 61/740,576, filed on Dec. 21, 2012.

(51) Int. Cl.
*A01C 1/06* (2006.01)
(52) U.S. Cl.
CPC ........................ *A01C 1/06* (2013.01)
(58) Field of Classification Search
CPC ............ A01C 1/06; A01C 1/00; Y10S 47/09; A01H 4/006; B01K 2/006; A01N 25/00; A01N 25/02; A01N 25/24; A01N 25/30; A01N 3/00; B05B 12/12
See application file for complete search history.

(56) References Cited

U.S. PATENT DOCUMENTS

| | | | | |
|---|---|---|---|---|
| 2,579,735 | A * | 12/1951 | Burgesser | A01C 1/06 47/57.6 |
| 4,272,417 | A * | 6/1981 | Barke et al. | 523/122 |
| 5,119,589 | A * | 6/1992 | Rowse | 47/1.01 R |
| 5,254,358 | A * | 10/1993 | Kouno | A01C 1/06 427/212 |
| 5,497,232 | A * | 3/1996 | Watano | B01J 2/00 356/23 |
| 5,512,101 | A * | 4/1996 | Kohno | A01C 7/042 118/23 |
| 6,202,346 | B1 * | 3/2001 | Lyons et al. | 47/57.6 |
| 6,329,319 | B1 | 12/2001 | Puglisi | |
| 2006/0236604 | A1 * | 10/2006 | Hesse et al. | 47/57.6 |
| 2010/0267554 | A1 * | 10/2010 | Madsen et al. | 504/100 |
| 2011/0039694 | A1 | 2/2011 | Rosa | |

OTHER PUBLICATIONS

Anonymous, "Urea and Seed Coating Processes," available at http://www.che.cemr.wvu.edu/publications/projects/prod_design/seeds%20and%20fertilizers.pdf, 32 pages, available at least since Dec. 2012.

Tony J. Vyn, et al., "Polymer Seed Coatings for Early Planting of Hybrid Corn in Indiana," available at http://www.agry.purdue.edu/staffbio/polymer_corn_presentation_02-05-04.pdf, 20 pages, dated Feb. 5, 2004.

Process Sensors Corporation, MCT 360 NIR Transmitter Brochure, undated, 2 pages, available at least since Dec. 2010.

\* cited by examiner

*Primary Examiner* — Kathleen Alker
(74) *Attorney, Agent, or Firm* — C. W. Arnett; Faegre Baker Daniels LLP

(57) ABSTRACT

A method of coating seeds is provided using observations of coating and coated seeds to modify the coating of yet-to-be coated seeds.

20 Claims, 1 Drawing Sheet

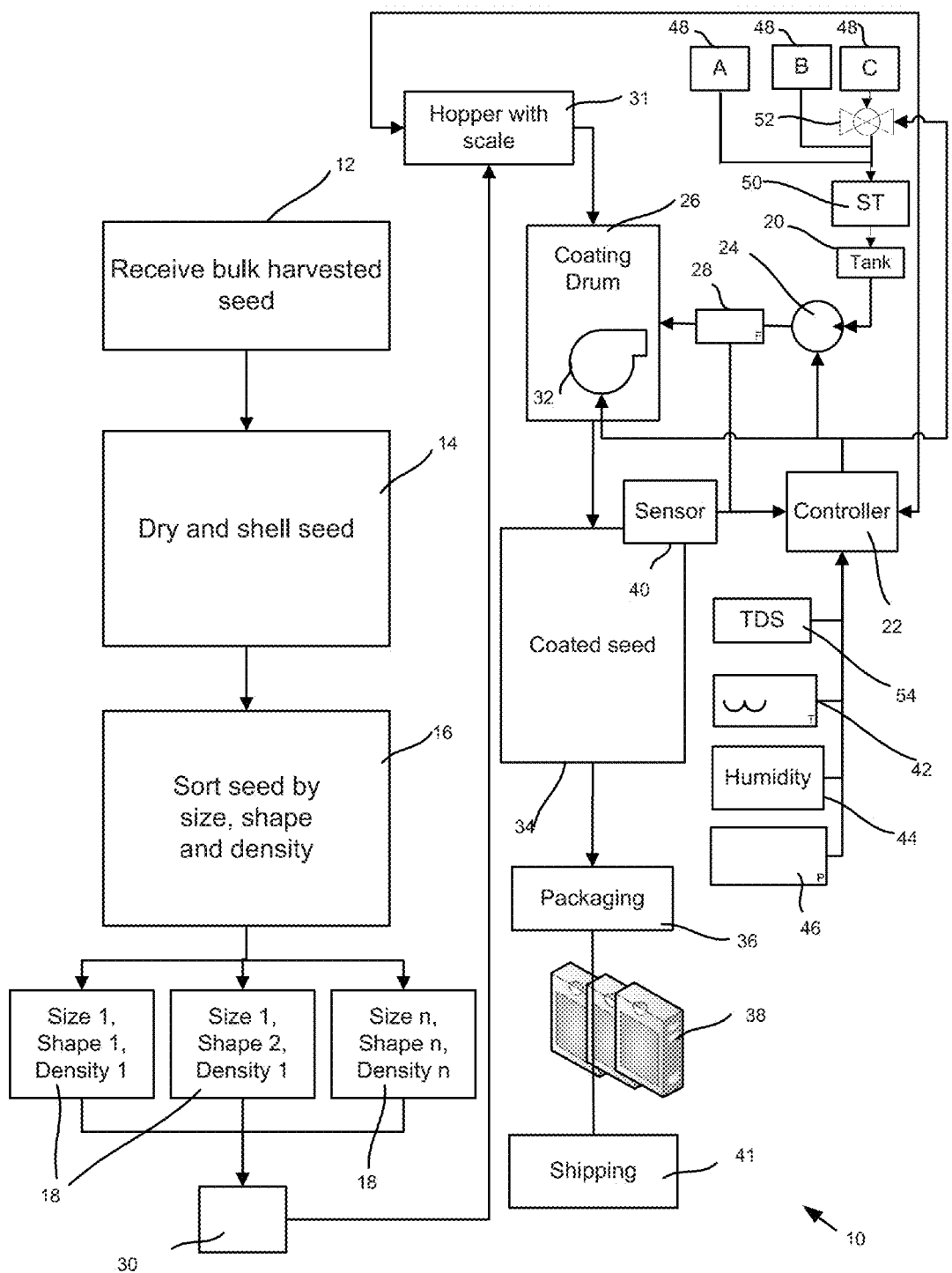

METHOD OF COATING SEED

RELATED APPLICATION

This application claims priority to U.S. Provisional Patent Application Ser. No. 61/740,576, filed Dec. 21, 2012, titled "Method of Coating Seeds" to Heather McConnell Smith et al., the entire disclosure of which is expressly incorporated by reference herein.

FIELD

The present invention relates to seeds, more particularly, to a method of coating seeds.

BACKGROUND

During farming, seeds are planted and germinate into plants. The plants produce seeds and/or other plant materials that are later harvested for food, raw material, etc. Some seeds are harvested to be replanted to grow additional plants. These seeds may be coated with materials to protect the seeds from pests, such as fungus and/or insects. Seeds may also be coated to control when the seeds germinate, provide a color to the seed for identification, and for other reasons.

SUMMARY

According to one aspect of the present invention, a method of coating seeds is provided. The method includes providing a plurality of seeds, coating the seeds with a coating, measuring a characteristic of the coated seed, and adjusting the coating of the seed in response to the measurement of the characteristic.

The above mentioned and other features of the invention, and the manner of attaining them, will become more apparent and the invention itself will be better understood by reference to the following description of embodiments of the invention taken in conjunction with the accompanying drawing.

BRIEF DESCRIPTION OF THE DRAWING

FIG. 1 is a schematic view of a system for coating seeds.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings.

Referring to FIG. 1, a seed processing plant 10 is shown that receives harvested seeds and processes the harvested seeds into seeds for planting. As a result of processing, the seeds are coated with materials to facilitate increased crop production yields.

After harvesting, plant 10 receives the seeds at a receiving pit, dock, or other area 12 configured to receive bulk seed. The seed is then stored in a hopper, bin, or other storage container (not shown) until it is time to process the seed. Initially, the seed is dried and shelled, if necessary, in a dryer and/or shelling machine, shown together as item 14 in FIG. 1. Next, the seeds are sorted by several characteristics, such as size, shape, and density in a sorting machine 16. Sorting machine 16 may include screens (not shown) that separate the seeds based on size and other machines known to those of ordinary skill in the art for separating the seeds by the other characteristics, such as shape (ex. flat or round) and density. After sorting, the seed is stored in a plurality of bins, hoppers, or other storage containers 18 by their respective types.

After sorting, the seed is coated with material. The material may include fungicides to prevent damage to the seed from fungus, insecticide to protect the seed from insects, colorant to identify the seed as treated seed, polymers or other coatings to control the introduction of moisture into the seed after planting to control germination, or other beneficial materials. As shown in FIG. 1, a tank 20 includes a mixture of these materials to be applied to the seed. A controller 22 operates a pump 24 that supplies the mixture to a coating drum 26. Coating drum 26 is preferably a coater manufactured by A/S Cimbria of Denmark, such as the Cimbria centricoater.

A flow meter 28 is provided in communication with controller 22 to measure the flow rate of the mixtures to coating drum 26. Using the detected flow rate, controller 22 can determine how much of the mixture is delivered to coating drum 26 and speed up or slow down pump 24 as desired and as discussed in greater detail below.

A bucket elevator 30 or other conveying device, such as an auger, delivers the seeds from bins 18 to a scale 31 until a predetermined weight of seed is delivered. Scale 31 and bucket elevator 30 are in communication with controller 22 that monitors the weight of seed supplied to scale 31 to turn on and off bucket conveyor 30. Next, the predetermined weight of seeds is dumped into coating drum 26. During delivery of the mixture from tank 20, coating drum 26 spins in an effort to provide a uniform coating of the material to the seeds. A fan 32 (with or without heat) blows air into coating drum 26 to decrease the amount of time necessary for the coating to dry sufficiently.

Several factors determine the moisture content (or how dry the coating is) when it leaves coating drum 26. For example, the length of time that the seeds remain in drum 26 (with or without fan 32 providing air) may impact the moisture content of the coating. Other factors may include the temperature, humidity, and pressure of the air delivered into drum 26 by fan 32 or otherwise. The rate of introduction of the mixture into drum 26 may also impact the moisture content of the seed as it leaves drum 26.

Drum 26 delivers coated seed to a hopper, bin, or other container 34 where it awaits packaging in packaging device 36 that packages the seed into bags, boxes, or other containers 38. After packaging, the seed is sent to a shipping area 41 for delivery to a warehouse, distributors, and/or end customers.

Preferably, seed from containers 18 are delivered in batches to drum 26 so that each batch has relatively uniform seeds resulting from the sorting process. As such, each container 38 of packaged seed is relatively uniform. By providing uniform seeds, farmers can select a particular size, shape, etc. of seeds to match the specifications of the planter used by the farmer to plant the seeds. For example, some planters are designed or adjusted for smaller seeds white other planters are designed or adjusted for larger seeds.

Improper moisture content of the seed can have a detrimental impact on the seed and the processing and ultimate use of the seed. For example, if the moisture content of the seed is too high, the seed may clump together, before, during, or after packaging. If the clumping is severe enough, the seed could jam equipment inside and outside of plant 10. For example, during planting, a farmer may have difficulty loading clumped seed into a planter. Similarly, if containers 38 are loaded onto the planter, seeds within container 38 may clump together and clog the planter.

According to the present disclosure, seed processing plant 10 is configured to monitor characteristics of the seed coating to reduce or eliminate moisture related issues, such as clumping, and/or other coating issues. As shown in FIG. 1, plant 10 includes a sensor 40 that detects moisture and/or other characteristics of the seed leaving coating drum 26. According to the preferred embodiment of the present disclosure, sensor 40 is a near infrared transmitter that, such as a NIR transmitter model MCT360 sold by Process Sensors Corp. of Milford, Mass., the irradiates the coated seed and detects the response of the seed to the irradiation to determine the moisture content. In addition to detecting the moisture content of the seed coating, sensor 40 can detect the color of the seeds and provide an indication corresponding to the thickness of the coating.

Sensor 40 provides data indicative of the seed coating characteristics to controller 22 that uses the data to control one or more factors that impact the moisture content of the seeds coating and/or other coating characteristics. For example, it is desirable for the seed coating to have a moisture content within a predetermined range. If the moisture content is too high, the seed may clump together as discussed above. If the moisture content is too low, it may indicate that the seed dried too long in drum 26, wasting operational time and other resources, such as electricity, used during the coating process and potentially resulting in less than adequate pest protection.

If controller 22 detects that the moisture content of the seed coating is approaching either end of the range or is too far away from a desired moisture content, controller 22 may adjust one or more of the parameters impacting the coating moisture. For example, if the coating is approaching being too moist, controller 22 may run drum 26 longer before emptying drum 26. The additional runtime allows the coating additional drying time. Similarly, if the coating is excessively dry, controller 22 may decrease the drum runtime to increase the speed at which batches of seed are coated. By decreasing the drum runtime, more seed can be coated and less electricity, etc. consumed during the coating process.

As mentioned above, sensor 40 may also detect other characteristics of the seed coating, such as the color of the seed coating. Preferably, each batch of processed seed has uniform color, which suggests uniformity of quality, etc. In addition to providing uniformity of appearance, uniform coating color may indicate uniformity of coating thickness.

One factor determining the color of the seed leaving drum 26 is the thickness of the coating applied to the seeds which includes a colorant. If the coating is thin, the amount of colorant applied to the seed is relatively low. As such, the seed color may be faint. Similarly, if the coating is thick, the amount of colorant applied to the seed is relatively high and the seed color may be dark.

If the seed coating is too thin, there may not be enough coating to be fully beneficial. For example, the seed may not have enough fungicide and/or insecticide to ward off or kill pests. If a polymer coating is too thin, too much moisture from the ground surrounding a planted seed may seep into the seeds causing the seed to germinate at too low of a temperature potentially exposing the germinated seed to a later freeze or frost that could kill or retard the new plant. Similarly, if the seed coating is too thick, excessive fungicide and/or insecticide may be provided that is unnecessary and wasteful. If the coating is too thick, too much polymer or other coating may delay (or prevent) germination of the seeds. If the germination is delayed, the new plant may not have the benefit of a full growing season, etc.

According to the present disclosure, sensor 40 provide data to controller 22 indicative of the color or tint of the seed coating leaving drum 26. Controller 22 uses this data to detect if the color is within a desired range indicating that the coating is also within a desired range of thickness. For example, if the color is too faint, it may indicate that the coating delivered to drum 26 is not sticking to the seeds. To increase the amount of coating delivered to drum 26 that is deposited and remains on the seed, the controller may decrease the flow rate of the coating mixture to drum 26. By decreasing the flow rate, the coating will have more time to dry as coating continues to flow into drum 26. Similarly, controller 22 may regulate fan 32. If fan 32 is off and controller 22 detects that the coating is approaching being too faint, controller 22 may turn on fan 32 for the next batch. Similarly, if controller 22 ran fan 32 during the previous batch, and detected that the color was approaching too faint, controller 22 may increase the fan speed or turn on a heater (not shown) to increase the evaporation rate in drum 26.

If the color is too dark, controller 22 may adjust factors to decrease the darkness of the next batch. For example, controller 22 may decrease the volume of mixture into drum 26 to provide less overall coating to reduce the coating thickness of the next batch.

In addition to using seed color as a proxy for the seed coating thickness, sensor 40 may also detect other indications of seed coating thickness. For example, sensor 40 may provide a value that is compared to a benchmark value. If the value is within an acceptable range of the benchmark, controller 22 may not need to make any adjustments. If the value is too high or too low, controller 22 may make adjustments to compensate for the next batch.

In addition to the factors discussed above, other factors may impact the moisture content and/or thickness of the coating applied to the seed. For example, the ambient temperature, humidity, and pressure of the air supplied to drum 26 may impact evaporation rates, which may impact the moisture content and thickness of the seed coating. As such, plant 10 may include additional sensors, such as a thermometer 42, humidistat 44, pressure gauge 46, etc. that communicate with controller 22 that makes adjustments based on the data communicated to it. For example, if the weather is damp and cold, the evaporation rate will be relatively low. As such, the amount of time that drum 26 must run to obtain a desired dryness will increase. Recognizing the damp, cold conditions, controller 22 may make a larger incremental increase in the runtime of drum 26 than if the ambient air was hot and dry. Similarly, if the air is hot and controller 22 may make smaller incremental adjustment to avoid overcorrecting on the next subsequent batch of seed being coated.

According to a preferred embodiment of the present disclosure, the coating process is tailored to specific groups of sorted seed to provide increased uniformity of coating thickness and/or moisture content for each specific seed grouping. For example, smaller seeds may require less coating than larger seeds. As such, controller 22 may deliver less coating to a batch of smaller seeds than to a batch of larger seeds. Similarly, controller 22 may operate drum 26 differently for different seed groupings. For example, larger seeds may require less dry time than small seed because there are larger gaps between larger seeds, which permits additional airflow and increases the evaporation rate. As such, the amount of drum runtime can be decreased and/or the flow rate of coating mixture into drum 26 can be increased. Similarly, smaller seeds may require more drum runtime and/or a slower feed rate. Depending on the seed grouping, controller 22 may make different adjustments to increase or decrease the seed moisture and/or coating thickness. For example, if large seeds are being coated, controller 22 may increase the flow rate or time at which pump 24 operates to increase the overall volume of coating supplied to drum 26 to compensate for the increased surface of the large seeds as compared to small seeds.

During coating of like seed groupings, controller 22 monitors the seed moisture content, color, and/or coating thickness and makes necessary incremental adjustments between batches. Assuming little or nothing changes between batches, controller 22 will continue to make incremental adjustments until further adjustments provide little or no incremental benefit. However, if something changes enough (for example the ambient temperature change a non-negligible amount), controller 22 will make one or more incremental changes. For each successive batch, controller 22 will continue to refine the adjustments until further adjustments provide little or no benefit.

As discussed above, different seed grouping may require different inputs to provide uniform seed coating thickness and moisture content between the various seed type groupings. When drum 26 transitions from coating one seed grouping to another, controller 22 resets the operational parameters to default settings rather than incremental changing from the operational parameters of the last seed grouping. As such, controller 22 includes a table containing the default operational parameters for each seed grouping. When controller 22 is informed of a change in seed groupings, it pulls the operational parameters for the particular seed grouping from the table. These default operational parameters may be adjusted based on other inputs to controller 22, such as the humidity, air temperature, etc. Based on these adjusted default parameters, controller 22 runs the first batch of the new seed grouping through drum 26. Upon completion of the coating process, sensor 40 determines the moisture content, color, and/or thickness of the first batch of the new seed grouping and provides this data to controller 22. Controller 22 makes incremental adjustment based on this and other data to improve or fine tune the moisture content and coating thickness and/or to improve the efficiency of the seed coating process.

As shown in FIG. 1, a plurality of supply tanks 48 are provided that supply coating ingredients to tank 20. Each supply tank 48 includes an ingredient (ex. ingredient A, ingredient B, ingredient C) that may be a component of a particular coating recipe. Valves (not shown) positioned between ingredient tanks 48 and common tank 20 control the flow of these components to common tank 20. Controller 22 controls these valves to determine the amount of material provided for the coating so that each batch of treated seed may have a different components and differing ratios of components in the coating. Depending on the observed conditions, controller 22 may make changes from one batch of coated seeds to the next. For example, if controller 22 determines that the thickness of the coating is within an acceptable range, but the color is darker than preferred, controller 22 may reduce the amount of colorant/dye in the next batch. As such, the thickness of the coating should not change significantly, but the coating should be closer to the preferred color shade.

In addition to controlling the recipe and rate of application of the coating, controller 22 may also control the amount of seed, the rate of introduction of the seed into drum 26, and when the seed is dumped into drum 26 based on Observed and other parameters. For example, if controller 22 observes that the coating thickness is not uniform from one seed to the next in a particular batch, it may indicate that the seeds are introduced too fast so that some seeds receive more coating than others because some seeds block others from receiving coating. As a result, controller 22 may stow down the introduction of the seeds into drum 26 for the next batch. If controller 22 observes that the uniformity is so precise to not have practical benefit, it may speed up the introduction of the seeds for the next batch to increase the production rate.

By observing characteristics of the coated seeds, controller 22 can adjust the manner of application of the coating to each successive batch of seeds. As discussed above, the manner of application may change by adjusting the flow rate of coating into drum 26. The manner of application may change by adjusting the runtime of the drum to increase the amount of dry time. As discussed herein or otherwise, the manner of application may be altered in other ways to facilitate optimal seed coating.

As discussed above, various ingredients are combined from supply tanks 48 to form the seed coating. Once combined, the seed coating has various characteristics that may impact the adhesion of the coating on the seeds. For example, one such characteristic is the surface tension of the coating. Seeds often have waxy surfaces. It is more difficult for some liquids to adhere to such waxy surfaces because of higher than desired surface tension of the liquid. To increase the adhesion of such liquids, surfactants may be added to the liquid to increase the adhesion or the hardness of the water used in the coating may be lowered.

According to the present disclosure, plant 10 includes a sensor 50 that measures an indicator of the surface tension of the seed coating. Sensor 50 provides this indication to controller 22 which determines if more or less surfactant is required to reach a desired surface tension for the coating. As shown in FIG. 1, controller 22 communicates with at least one valve 52 that controls the flow of ingredients (ingredient C, a surfactant) from tanks 48. If controller 22 detects that the surface tension of the coating is too high, it may open valve 52 more to increase the amount of surfactant to lower the surface tension of the coating. Similarly, if the surface tension is too low to provide a reasonable benefit, controller 22 may close valve 52 more to decrease the amount of surfactant to raise the surface tension of the coating.

According to the present disclosure, surface tension sensor may be a tensiometer that measures the surface tension, a UV Vis spectrometer that measures the micelle concentration of the coating, or any other suitable sensor that provides an indication of the surface tension of the coating. By using a UN Vis spectrometer to measure the micelle concentration, controller 22 can determine if the coating has reached or exceeded the critical micelle concentration (CMC) at which point adding further surfactant to the coating has little or no additional impact on lowering the surface tension. if the CMC is reached, controller 22 may determine that the coating needs other adjustments to move the surface tension to a desired range, such as lowering the hardness of the water used in the coating.

The quality of the water used as a solvent in the coating is one factor that influence the surface tension of the coating. Typically, the harder the water the amount of total dissolved solids (TDS), such as calcium) is the higher the surface tension. Thus, if the surface tension of the coating is too high, the hardness of the water may be adjusted, According the present disclosure, TDS sensor 54 is provided that monitors the hardness of the water (ex. ingredient B) used in the coating. if the water is too hard, controller 22 may provide instructions to treat the water to lower the hardness by removing solids, such as calcium, using known techniques for lower water hardness.

While this invention has been described as relative to exemplary designs, the present invention may be further modified within the spirit and scope of this disclosure. Further, this application is intended to cover such departures from the present disclosure as come within known or customary practice in the art to which this invention pertains.

We claim:

1. An automated method of coating seeds, the method including the steps of:
   providing a plurality of seeds, a coating, and a controller,
   applying the coating to at least one of the seeds of the plurality of seeds through control by the controller in a first manner, to produce at least one coated seed having a first coating;
   observing a characteristic of the first coating of the at least one coated seed, and
   applying the coating to at least one of the seeds of the plurality of seeds through control by the controller in a second manner that is different than the first manner based on the observed characteristic of the first coating of the at least one coated seed.

2. The method of claim 1, wherein the observed characteristic is a moisture content of the at least one coated seed.

3. The method of claim 1, wherein the observed characteristic is a color of the at least one coated seed.

4. The method of claim 1, wherein the observed characteristic is indicative of a thickness of the coating applied to the at least one coated seed.

5. The method of claim 1, wherein the first and second manners have different application rates of the coating.

6. The method of claim 1, wherein the first and second manners have different runtimes.

7. The method of claim 1, further comprising the step of adjusting an ingredient content of the coating based on the observed characteristic of the first coating of the at least one coated seed prior to the step of applying the coating in the second manner.

8. The method of claim 7, wherein an amount of a surfactant in the coating is adjusted during the adjusting step.

9. The method of claim 1, wherein the observed characteristic is indicative of the surface tension of the coating.

10. The method of claim 1, wherein the observed characteristic is the surface tension of the coating.

11. The method of claim 10, wherein the first manner includes supplying the coating at a first flow rate to a drum rotating at a first speed and wherein the second manner includes supplying the coating at a second flow rate to a drum rotating at a second speed, wherein the first flow rate and the first speed are different from the second flow rate and the second speed.

12. The method of claim 1, wherein the observed characteristic is the micelle concentration of the coating.

13. The method of claim 1, wherein the observed characteristic is the hardness of water that is an ingredient in the coating.

14. The method of claim 1, wherein the amount of total dissolved solids in the coating is changed based on the observation.

15. The method of claim 1, further comprising the step of observing an ambient condition, wherein the first manner is based on the observed ambient condition.

16. The method of claim 15, wherein the ambient condition is the temperature.

17. The method of claim 15, wherein the ambient condition is humidity.

18. The method of claim 15, wherein the ambient condition is the air pressure.

19. The method of claim 1, wherein the coating includes at least one of a fungicide, an insecticide, colorant and a surfactant.

20. The method of claim 1, wherein the first manner includes supplying the coating at a first flow rate to a drum rotating at a first speed and wherein the second manner includes supplying the coating at a second flow rate to a drum rotating at a second speed, wherein the first flow rate and the first speed are different from the second flow rate and the second speed.

* * * * *